Mar. 3, 1925.

A. F. POOLE 1,528,567

REGISTERING MECHANISM

Filed Nov. 17, 1921

INVENTOR
Arthur F. Poole
By Jacob Felbel
HIS ATTORNEY

WITNESSES
L. Nelson.
R. H. Strother.

Patented Mar. 3, 1925.

1,528,567

UNITED STATES PATENT OFFICE.

ARTHUR F. POOLE, OF KENILWORTH, ILLINOIS, ASSIGNOR TO REMINGTON ACCOUNTING MACHINE CORPORATION, OF NEW YORK, N. Y., A CORPORATION OF NEW YORK.

REGISTERING MECHANISM.

Application filed November 17, 1921. Serial No. 515,887.

*To all whom it may concern:*

Be it known that I, ARTHUR F. POOLE, a citizen of the United States, and resident of Kenilworth, in the county of Cook and State of Illinois, have invented certain new and useful Improvements in Registering Mechanism, of which the following is a specification.

My invention has for its principal object to detect immediately a mistake in copying a number or similar combination of characters and thereby to improve the accuracy with which numbers or similar combinations of characters are copied, as for example where the operator of a typewriting machine or of a calculating machine copies or enters into the machine a number previously printed on a piece of paper. There are many operations where it is necessary to copy numbers, sometimes quite long ones, either to transcribe said numbers from one paper to another or else to introduce said numbers into a calculating machine to serve as a part of a computation. A familiar instance of this problem is presented by the ordinary loose leaf ledgers now in extensive use in banks and other business houses. A sheet of such a ledger contains a column in which has been written the balance of an account following the last transaction; another column in which the said balance is copied when the ledger sheet is first put into the accounting machine, and other columns in which debit and credit items are written. It is now common to have a calculating machine especially arranged for such a ledger sheet. The operator inserts a sheet into the machine and copies in one of the columns above mentioned the old balance as already indicated in an adjoining column. The paper is then moved to position to receive the debit and credit transactions of the day, the calculating mechanism computing a new balance from the three items mentioned, namely, the old balance, the debit transactions and the credit transactions; and said new balance is then printed in its appropriate column. In some machines this new balance is printed automatically and in other machines, such for example as the Remington accounting machine with the Wahl mechanism, the new balance is copied by the operator striking the numeral keys of the machine. In the case of listing machines such as the Burroughs, the machine itself automatically prints the new balance so that said new balance is mechanically correct. In machines of the other type where the operator copies the new balance, means have been provided and are known in the prior art whereby the accuracy of the transcription is automatically and mechanically checked or proved. Usually before transcribing the new balance the machine is either manually or automatically set for subtraction and the act of writing the balance subtracts it from itself in the computing machine and thus restores the registering mechanism to zero; and mechanical means have been provided for testing at that moment the condition of the wheels as to clear or not clear. If the wheels are clear it indicates that the balance was correctly transcribed or copied.

So far as I am aware, however, no mechanical means has ever been provided for proving or insuring the accuracy with which the operator enters the old balance into the machine, said old balance being copied by the operator from the paper. The custom has been to write the old balances and the new balances in parallel columns so that they can be compared visually. By my invention I provide mechanical means to inform the operator at once in case a number has been incorrectly copied from the paper, or from some other source extraneous to the machine.

Broadly stated, my invention includes registering mechanism adapted to compute a short function or symbol of the number or of the digits of the number. The construction and mode of operation are such that at the time when the number is originally printed on the paper this computed symbol or function is printed in conjunction with it, and when in a subsequent operation the operator copies the number he will also copy said symbol. In the act of copying the number or of entering it into the calculating machine the symbol appropriate to that particular number is automatically re-computed. If the number is correctly copied the machine will compute the same symbol for that number that was computed for it in the first place when the number was originally printed. If, then, the operator copies from the paper the symbol there written the mechanism will, as it were, compare the symbol then computed with that copied from the paper, and if the number and symbol have been correctly copied, then the machine will indicate that the copying has been correctly done; but if a mistake is made either in the copying of the number or in the copying of its symbol, then the newly computed symbol will not agree with the symbol copied from the paper and the machine will automatically give the operator notice of that fact.

In the present instance I have illustrated and shall describe in detail one specific instance of my invention but it will readily be perceived that the invention is capable of a wide variation both in mechanical construction and also in application. The symbol or function referred to can be computed not only in conjunction with a calculating machine but also in conjunction with other machines adapted for the printing and copying of numbers, for instance, any number printing machine. Moreover, the symbol can be printed not only in conjunction with numbers printed by or from a calculating machine or other automatic number printing machine but even if the numbers are printed in a book of tables each one can have printed with it its appropriate symbol and whenever it is necessary to copy these numbers they can be copied on a machine having my invention embodied therein and the machine will automatically notify the operator in case he has incorrectly copied any number from the book. In short, my invention is capable of a wide range of applications and a wide range of variation in its construction and details.

To cite some of the many variations in the application of my invention, it may be mentioned that it is not necessary that the several digits be the digits of a single number. If several numbers are printed, either in a line or otherwise, a symbol can be computed which would test the accuracy of the copying of, for example, an entire line of numbers. It may also be mentioned that by a slight variation in the mechanism, or for that matter without any mechanical variation at all in some instances, the invention is applicable to amounts written in non-decimal notation, such for example as amounts in English money. Indeed, it is not essential that the characters copied be numerical digits; they might be letters or other printed characters.

In the accompanying drawings.

The Remington accounting machine consists of a Remington typewriter with the Wahl calculating mechanism attached. Except as hereinafter set forth the accounting machine partially illustrated in the drawings is similar to and may be identical with that shown and described in detail in the patent to Wahl No. 1,270,471, dated June 25, 1918, and which is extensively manufactured and marketed.

Figures 1, 8:
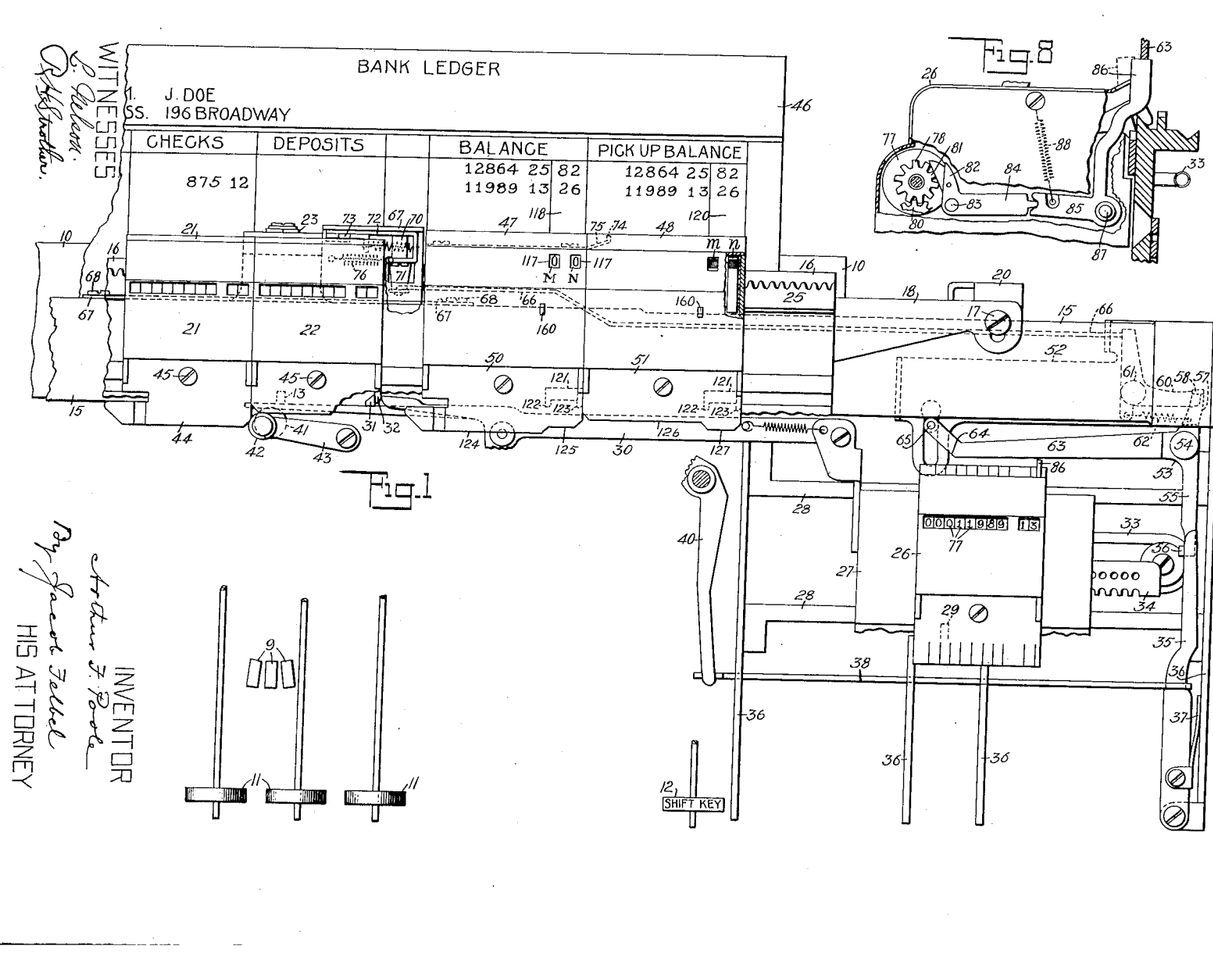
Figure 1 is a partial and more or less conventional front elevation of a Remington accounting machine having the mechanism of my invention embodied therein and having therein a bank ledger sheet.
Figure 8 is a fragmentary side view of the cross-totalizer and a portion of the clearance proof mechanism.

In Fig. 1, 10 represents the platen of the Remington typewriter, 11 the numeral keys thereof, and 12 the shift key, depression of which results in the printing of an upper case character; and some of the types are conventionally shown at 9.

Figure 2:
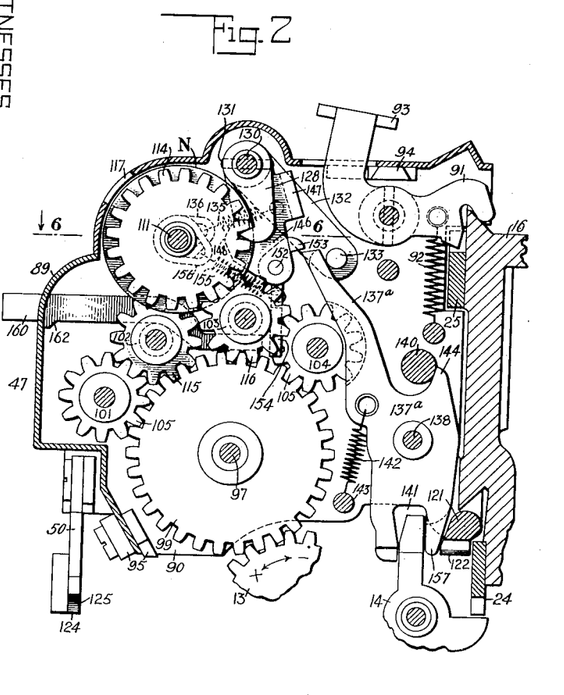
Figure 2 is a right-hand side elevation of a function or symbol computing register in section just inside the right-hand side plate.
Figure 3:
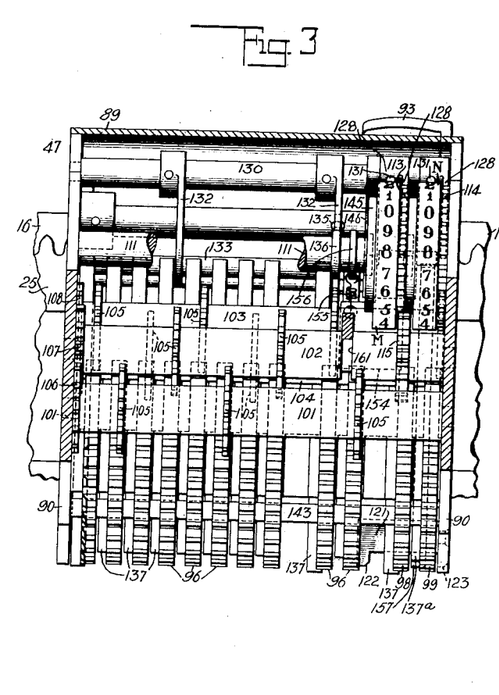
Figure 3 is a front elevation of the same with the front part of the cover plate sectioned away.

The Wahl calculating mechanism includes a main actuator, the principal working parts of which shown in the present drawings, are the master wheel 13 and master dog 14, Fig. 2. I have not deemed it necessary to illustrate the Wahl mechanism in detail because it is well known in the art and is fully described in the patent above cited. In addition to the main actuating mechanism, above briefly referred to, there is also a cross or auxiliary actuating mechanism operated by the main actuating mechanism and including a master wheel, master dog and other devices designed to operate and control a cross footing totalizer.

The framework of the Wahl mechanism includes a stationary casting 15, Fig. 1, suitably secured to the framework of the typewriter, and the main truck 16 is suitably supported and guided on the frame 15 at the middle of the machine, and is connected with the typewriter carriage to travel therewith by means of a screw 17 passing through an arm 18 on the truck and screwed into an arm 20 of the typewriter carriage. There is similar connection at the other end of the truck. On said truck are mounted any suitable number of vertical or columnar totalizers 21, 22 and these are adapted to be operated one wheel of one totalizer at a time by the master wheel 13, which latter is situated about in the front to rear vertical plane of a pointer 23 at the middle of the machine, which pointer is mounted on the frame 15. Said truck 16 has a rack bar 24, Fig. 2, with which the master dog 14 co-operates and it also has a rack bar 25 to which the totalizers are latched, after being adjusted. The machine has a main master wheel 13 for operating the columnar totalizers.

The cross footing totalizer 26 is mounted on an auxiliary truck 27 adapted to reciprocate on stationary trackways 28. Said truck is intermittently drawn toward the left by means of a hook 30, the lug 31 of which engages lugs 32 projecting from the side plates of the columnar totalizers. After writing the last or lowest digit of a number this hook is cammed loose and the cross totalizer and its truck 27 are withdrawn toward the right by means of a spring 33. Said truck 27 has an adjustable stop arm 34 projecting therefrom, and when the truck moves back to its right-hand position, said arm operates a lever 35 pushing it to the right and against one of the frame plates 36 of the cross footing mechanism against the pressure of a spring 37. This lever 35 operates a slide bar 38 which is connected with a bell crank 40 which controls one member of a key lock. Said key lock member is also controlled by a roller 41 adapted to be depressed by a certain trackway on the underside of each of the columnar totalizers. The construction of this lock is such that when a columnar totalizer is over the master wheel 13, but it has failed to pick up the cross totalizer 26 so that the truck of said cross totalizer is still pressing the lever 35 toward the right, then the keys of the machine will be locked. This locking mechanism is fully described in the Wahl patent above referred to.

The Wahl mechanism is adapted for both addition and subtraction, these functions being obtained by means of a certain change gear mechanism fully described in the Wahl patent above referred to. As set forth in said patent the master wheel of the cross footing mechanism can be controlled automatically for addition, subtraction and disconnect. This mechanism includes a follower roller 42, Fig. 1, mounted on the end of an arm 43, which arm is secured to the end of a rock shaft and is spring pressed upward. In its normal upper position it sets the cross master wheel mechanism for addition. When the roller 42 is depressed to its lowest position it sets said mechanism for subtraction, and when it is depressed to an intermediate position the cross master wheel is disconnected so that it is not rotated at all by the numeral keys. Said roller is controlled by certain cams 44 detachably secured as by screws 45 to the front lower parts of the several columnar totalizers. When a columnar totalizer has a high cam on it, such as the one shown on totalizer 22, in Fig. 1, or if said totalizer has no cam on it at all, the roller 42 will rise to its highest position and set the cross footer for addition. Vertical totalizer 21 is shown with a deep cam on it to set said mechanism for subtraction, and users of these machines are also provided with a cam not quite so deep as the one last mentioned, the effect of which is to disconnect the cross master wheel.

I have shown in Fig. 1 a bank ledger sheet 46 mounted in the typewriter and ruled for four columns of figures, the first beginning at the left being for checks cashed by the bank; the second for deposits: the third for the current balance, and the last for a pick-up balance. In the Wahl machine as heretofore employed for writing and computing a ledger sheet of this character there is mounted on the truck 16 a columnar totalizer 21 into which are added the amounts of checks, and said totalizer is provided with a cam 44 adapted to set the cross computing mechanism for subtraction. Said truck also has a columnar totalizer 22 corresponding to the column headed "Deposits," and this totalizer either has a cam 44 adapted for addition or else has no cam at all. In either event deposits are added in the cross totalizer 26. It has been the custom either to have two columnar totalizers for the "Balance" and "Pick-up balance" columns or else two dummies, that is to say, two totalizer frames but with no computing mechanism therein. Of these totalizers or dummies the one for the column headed "Balance" carries a cam 44 to set the cross-computing mechanism for subtraction so that when copying the "Current balance" from the cross footing totalizer 26, said totalizer will be cleared or brought to zero. The totalizer or dummy for the "Pick-up balance" column sets the cross footing mechanism for addition. In these two columns I have replaced the vertical totalizers or dummies with function or symbol computing registers 47 and 48 peculiar to the present invention, and these carry cams 50 and 51 which control the roller 42 but in a peculiar manner which will be hereinafter described.

The mode of operation of the Wahl machine as heretofore constructed and arranged in the manner above described is as follows:

When John Doe's ledger sheet is first put into the machine the last previously written line terminates with the "Balance" written in the third column. The paper is run into the machine until the same line is in position for printing by the typewriter types 9. The old balance is then copied in the "Pick-up balance" column, and automatically added into the cross footer 26. The typewriter carriage is then drawn back to the right and line spaced and the new debtor and creditor items, namely, the checks and deposits for that particular day, are entered in the first and second columns of the paper. The amount of the checks will be subtracted in the cross totalizer 26 and the amount of the deposits will be added so that said cross totalizer will now show the new balance. This is copied in the "Balance" column and subtracted out of the cross totalizer, which, if the work has been correctly done, will thereby be brought to clear or zero. This ledger sheet is then removed from the machine and the ledger sheet of some other depositor is put in and operated on in the same manner. The machine is operated in much the same way with my improvements except for the computing and printing of a certain function or symbol, as will be more fully set forth hereinafter. In Fig. 1 the machine is shown in the condition it occupies just after the last balance, namely, $11,989.13, has been copied on the paper and the carriage has been drawn back to position to enter a deposit. The amount of this balance, namely, $11,989.13 is indicated on the cross totalizer 26.

When the "Balance" is copied from the totalizer 26, the operator can verify the correctness of the copying by observing said totalizer which, if no mistake has been made, will then stand at zero. A more positive check is desirable, however, and for this purpose any suitable clearance proof mechanism may be employed. I have shown in the drawings a clearance proof mechanism which is not shown in the Wahl patent above referred to but which is shown, described and claimed in a prior application of mine filed April 19, 1921, Serial No. 462,628. A frame plate 52 is secured to the right-hand part of the stationary frame 15 and a three-armed lever 53 is pivoted to said plate at 54. The depending arm 55 of said lever has a lug 56 engaging the lever 35 in such wise that if said lever 53 be rocked about its pivot, it will move lever 35 to its right-hand or locking position, and thus operate the key lock hereinbefore referred to. Said lever 53 has an upstanding arm 57 having a lug 58 thereon, which is normally engaged by a latch lever 60 pivoted at 61 to the plate 52. A spring 62 tends to hold said latch lever in latching position and also tends to rock the lever 53 to locking position, the latch 60 normally holding said lever 53 against the tension of said spring. The third arm 63 of the lever 53 extends toward the left and near its free end it is made with an incline or cam edge 64. At its extreme free end this arm has a pin 65 that runs in a suitable slot in the plate 52 to guide the lever arm. In order to release the latch lever 60 immediately after the writing of the last digit of the "Balance," said lever has an upstanding arm adapted to be pushed toward the right by a long push link 66.

Near the middle of the machine and a little to the right of the pointer 23 a frame plate 67 is secured to the casting 15 by means of screws 68. This plate is bent first upward and then forward and it has a pivot 70 depending from its upper part to which is pivoted a bell crank having a rearwardly and downwardly extending arm 71 to which the left-hand end of link 66 is pivoted. Said bell crank has a second arm 72 extending leftward from the pivot 70 and carrying a dog 73, which dog is adapted to be struck by a bevel tooth 74 on the end of an arm 75 secured to the upper part of the function computing register 47. The construction is such that as the typewriter carriage and the truck 16 move step-by-step toward the left, in that step of said carriage and truck which immediately follows the writing of the last digit of the new balance, tooth 74 will engage dog 73 and push it and arm 72 toward the rear, thus moving arm 71 and link 66 toward the right and depressing the latch 60 so as to release lever 53 and allow it to lock the machine by operating lever 35. The dog 73 is provided so as to prevent operation of these devices when the carriage is moving toward the right, said dog at that time merely yielding and not operating the lever arm 72. The bell crank 71, 72 is controlled by a spring 76 which normally holds it against a stop, not shown.

The cross totalizer 26 is of the usual construction except as now to be described. It contains a series of register wheels 77 each having a ten-toothed pinion 78, said pinion driven by an idler gear 80 as is usual. One tooth 81, however, of the pinion 78 is made shorter than the rest and a feeler comb 82 extending across the series of register wheels has one finger adapted to be pressed against the teeth of each of the pinions 78. The construction is such that when all of the wheels stand at zero the short teeth 81 will all be opposite the comb 82 which then can move forward to the position shown in Fig. 8, but if any one of said wheels does not stand at zero a long tooth of its pinion 78 will be in front of the finger of the comb 82 and will force said comb towards the rear of the machine. Said comb is pivoted at 83 and at its right-hand end it has an arm 84 articulated by tooth and notch connection with another arm 85 of a bell crank having an upstanding arm 86 which projects out through a slot in the top casing plate of the totalizer, said bell crank being pivoted at 87. A spring 88 acts on this train of mechanism to press the comb 82 into engagement with the pinions 78. The construction is such that when all of said pinions stand at zero the upper end of the arm 86 occupies its rear position shown at Fig. 8 but in case any wheel does not stand at zero said arm will be moved forward to the dotted line position shown in said figure. When arm 86 is in its rear position it is in the transverse vertical plane of the arm 63 hereinbefore described and when it is in its forward position indicating that the register is not clear then it is in front of said plane. It will be recalled that immediately after the writing of the last digit of the balance the tooth 74 trips the bell crank 72, 71, releases the latch 60 and allows the three-armed lever 53 to move to its locking position, this motion including a downward motion of the arm 63. At that same step of the carriage the hook 30, 31, is cammed loose and the cross footer truck 27 jumps toward the right. If at that instant the wheels 77 all stand at zero, arm 86 will strike the cam edge 64 of arm 63 and restore said arm and unlock the machine. If, however, any one or more of said wheels is out of its zero position the arm 86 will occupy its forward position and will not strike the arm 63 and the machine will remain locked, so that further operation of the numeral keys is prevented, and the operator is thereby warned that he has not copied the balance correctly.

The function or symbol computing register 47 is illustrated in detail in Figs. 2 to 7 inclusive of the drawing, and the register 48 is exactly like it except as to the markings on the dials. The register comprises a casing plate 89 and left and right-hand side plates 90 which at their rear edges are shaped exactly the same as Wahl totalizers so that the register can be detachably and adjustably mounted on the truck 16 in the same manner as such totalizers. Said register is latched in place by a hand operated latch 91 controlled by a spring 92 which latch hooks over the dove-tail part of the truck and has a tooth engaging the rack 25, all in the same manner as ordinary Wahl totalizers. the only difference being that the finger key 93 of this latch mechanism is made shorter in order to avoid interference with some of the working parts. In most respects the shape and framing of the register 47 is similar to and in some respects it is identical with the construction of Wahl totalizers. For example, the side plates 90 are connected together at the top by a bar 94 and at the bottom by two bars 95 which are substantially like those of the Wahl totalizer. Moreover, said register comprises a series of gear wheels 96 journaled on a fixed rod 97, said gear wheels being exactly like the thirty-toothed gears of a Wahl totalizer in respect to diameter, number of teeth, and location. They differ from said Wahl wheels however in that they have no sections adapted for co-operation with Geneva transfer wheels but are on the contrary plain spur gears, so disposed that they engage the master wheel 13 like the gears of the totalizer, and they are spaced to correspond with the spacing of the wheels of the cross footing totalizer 26. The symbol computing register is however wider in a right and left-hand direction than said cross footing totalizer and it contains two additional thirty-toothed gears 98 and 99 arranged at the right of the gears 96 and preferably with an intervening letter space between the gear 98 and the last gear 96. This intervening space is not mechanically or theoretically necessary but it is convenient in connection with the printing as will hereinafter appear.

Four shafts 101, 102, 103, and 104 are arranged about the gears 96, said shafts being journaled at their ends in the side plates 90 and each of them has fast thereon or integral therewith several pinions 105. Each of the gear wheels 96 is engaged by one of these pinions 105, said pinions being distributed according to a scheme which will presently be explained in detail. Shaft 101 has also a pinion 106, which meshes with a pinion 107 on shaft 102 so that these two shafts are geared together to turn in opposite directions. Shaft 103 carries a pinion 108 which meshes with a pinion 109 on shaft 104 so that these two shafts 103 and 104 are also geared together to turn in opposite directions.

A shaft or rod 111 is mounted in the upper part of the register, being secured at its ends to the side plates 90 by screws 112. At its right-hand end this rod has journaled thereon two dials M and N, the former of which has a pinion 113 and the latter a pinion 114 rigid therewith. In the present instance these are twenty-toothed pinions but the number of teeth can be varied. The pinion 113 is directly geared to the shaft 102 by means of a pinion 115 rigid on said shaft. This pinion is similar to the pinions 105 but is made a little wider so as to engage not only the pinion 113 but also the gear 98 so that said gear 98 and the dial M turn in the same direction. The pinion 114 of the dial N is geared to the shaft 103 by means of a pinion 116 rigid on said shaft and which pinion also meshes with the gear 99 so that said gear 99 and the dial N turn in the same direction. Each of the dials M and N has suitable characters marked thereon and adapted to be read through sight openings 117 in the casing 89 of the register. In the present instance it is convenient to use the ten digits, 0-9, although letters or other characters may be employed if preferred, and in some other machines some other characters might be more convenient. Since the pinions 113 and 114 have twenty teeth, there are two of the series of ten digits around each of the dials.

The arrangement of the gearing in this register can be varied considerably, according to the particular function, symbol or characteristic, which it is desired to compute. In the present instance the pinions 105 are arranged as follows: Beginning with the right-hand one of the gears 96, which gears correspond in denominational positions with the carrying gears of the cross totalizer 26, the first gear 96 is geared to shaft 101, the second to shaft 103, the third or units of dollars wheel to shaft 102, and the fourth to shaft 104. Beginning with the fifth wheel, this order is repeated; that is to say, the fifth wheel 96 is geared to shaft 101, the sixth to shaft 103, the seventh to shaft 102, and the eighth to shaft 104, thus completing another group of four wheels. This particular register has ten wheels and the last two begin another set of four; that is to say, the ninth wheel is geared to shaft 101 and the tenth to shaft 103. Since the shafts 101 and 102 are geared to dial M, and the shafts 103 and 104 to dial N, it will be perceived that beginning with the right-hand wheel 96 the odd numbered wheels are geared to the dial M and the even numbered wheels to dial N. It will also be perceived that of the odd numbered wheels the first is so geared to the dial M that it and said dial rotate in opposite directions, the next odd numbered wheel 96 is geared to turn the dial M in the same direction as itself, and so on. If for simplicity of description we call motion of the dials toward the back of the machine (clockwise in Fig. 2) negative and motion in the opposite direction positive, then the construction is such that every digit added on the first wheel 96 will be added on the dial M, digits added on the third wheel 96 will be subtracted on the dial M, digits added on the fifth wheel 96 will be added, those added on the seventh wheel will be subtracted, and so on.

Referring to the even numbered wheels 96, digits added on the second wheel will be subtracted on the dial N, those on the fourth wheel will be added, those on the sixth subtracted, those on the eighth added, and so on. In the above analysis of this gearing, when I speak of adding and subtracting on dials M and N, I use those words arbitrarily as a convenient means of designating the direction of rotation of said dials. As a matter of fact it is immaterial which direction of rotation is addition and which is subtraction, and in case letters were used on the dials instead of figures, and especially in case mere arbitrary characters were used, it might not be considered that there was any real distinction of addition and subtraction. The real relation is that if, for example, 5 be added on the first wheel 96, the dial M will be turned five teeth in one direction, and if 4 be added on the third wheel 96, the same dial will be turned four teeth in the opposite direction, and so on.

In the Wahl machine the master wheel 13 turns forward (counter-clockwise in Fig. 2) for addition and in the opposite direction for subtraction, so that the carrying wheels of a Wahl totalizer, and likewise the wheels 96 of the present invention, turn rearward (clockwise in Fig. 2) for addition. When I say, therefore, that if the digit 5 be struck in the lowest order of this register, 5 will be added on the dial M, I mean that said dial turns toward the front of the machine (counter-clockwise in Fig. 2) five teeth. I have shown the digits arranged on said dial M in such order that turning the dial in that direction causes the indication to be increased in numerical value.

Wheel 98 is directly geared to shaft 102, so that when a digit of the function or symbol is copied from the dial M, said digit will be subtracted and the dial thereby set to zero. Wheel 99 is geared direct to shaft 103 and, therefore, causes the second digit of the symbol to be subtracted out and dial N to be set to zero. When the symbol is copied from the wheels M, N, it will be written in column 118, and it is subsequently copied from said column 118 into column 120, to the right of the "Pick up balance."

The general scheme of this register can now be explained. When the new balance is copied on to the paper from the cross totalizer 26 into the third column of the work sheet 46, the wheels 96 corresponding in denominational position to the respective wheels of the cross totalizer, will be turned in positive direction although at that time the wheels of said cross totalizer will be turned in negative direction so as to subtract the total out of said cross totalizer. It will be perceived that the dial M will be turned in accordance with all of the digits of odd numbered denominational positions and that the dial N will be turned in accordance with all of the digits of even numbered denominational positions. But each of said dials will be turned first in one direction and then in the other, with the result that there will be computed on each of said dials a function or symbol characteristic of the particular combination or series of digits that have been written. These digits are written from left to right but it is more convenient to count them from right to left for obvious reasons. Counted in this way the odd numbered digits (or the digits in odd number denominational positions) of the particular balance indicated on the cross footer 26 are respectively 3, 9, 9 and 1 and the function computed on the dial M will be $$3-9+9-1=2$$

so that 2 would show on the dial M. The even numbered digits are respectively 1, 8, and 1. Of these the first would be subtracted, the second added, and so on, so that the computation on dial N would be $$-1+8-1=6$$

so that the digit 6 would show on dial N. The computed symbol is therefore 26 and the operator will write this symbol in the column on sheet 46 marked 118. In the act of writing this function or symbol the wheels 98 and 99 will be turned in positive direction and as these are geared to turn the dials M and N respectively in negative direction the act of writing the symbol will bring said dials back to zero.

The register 48 is like register 47, except that its dials m and n have each two red spots marking the initial or zero position of the dial, the remainder of each dial being solid black. Even this difference between the two registers, though it is advantageous, is not absolutely essential.

When on again taking up the ledger sheet to make a new entry in it, the balance 11,-989.13 is copied in the pick-up balance column and the wheels of the symbol computing register 48 will then be operated in exactly the same way as the corresponding wheels of the register 47 were operated when the balance was originally written. Consequently identically the same function or symbol "26" will be computed on the wheels m and n although said function will not be visible to the operator, these wheels being blank. The operator must therefore copy this function "26" from the column 118 on the paper. In doing so, if his work has been done correctly he will restore the wheels m and n to zero, which fact will be indicated to him by the two red spots showing to the sight openings. If he has copied any digit erroneously the computed function will be erroneous and will not correspond with the function which he copies from column 118 on the paper, with the result that one of the dials m or n will not display its red spot and he will thereby be notified that he has copied the number wrong.

In their relation to the cross totalizer 26 the symbol computing registers 47 and 48 perform all the functions of dummy totalizers; that is to say, they pick up the hook 30, 31 and control the follower rollers 41 and 42. As each of these registers is, however, three letter spaces wider than the totalizer 26, it is obvious that the right-hand side plate of the register cannot be used in the first instance to pick up the cross footing truck. I have therefore provided in each of said registers a block 121 having a lug 122 in position to co-operate with the lug 31 so as to bring the wheels 96 into correct denominational relation with the carrying wheels of the cross totalizer 26. It will be obvious, therefore that said hook 30 will be cammed loose from the lug 122 on that step of the carriage immediately succeeding the printing of the last digit of the balance. If said truck were allowed to move through its full excursion to the right, it would strike the lever 35 and lock up the machine, and if it were allowed to jump down from the lug 122 of register 47 to the corresponding lug of register 48, this, under certain conditions, might cause the machine to be locked. I therefore provide also a lug 123 on each of the registers 47 and 48 to arrest the cross footer truck after only a short jump to the right. This jump is sufficient, however, to enable the arm 86 to release the locking lever 53 in case the total has been correctly copied from the cross footing totalizer.

From the above description it will be apparent that during the writing in columns 118 and 120 of the symbol the two lowest wheels of the cross totalizer 26 will be in engagement with the master wheel. It is therefore essential that at that time said master wheel be disconnected so as not to turn said wheels. To this end the cams 50 and 51 are made of the peculiar configurations shown in Fig. 1. Said cam 50 has throughout the greater part of its length a level 124 adapted to set the cross footer for subtraction but the last three letter spaces of said cam are at a higher level 125 corresponding to disconnect of the cross footing master wheel. The main part of the cam 51 is at a high level 126 corresponding to addition in the cross footer but its last three letter spaces are at a level 127 corresponding to disconnect. The balance is therefore subtracted from the cross footer and the pick-up balance is added in said cross footer, but the symbols copied in columns 118 and 120 are not registered in the cross footer.

It may be remarked that since the gear 98 and all of the odd numbered gears 96 are geared to dial M all of the gears mentioned will be turned whenever any one of them is turned though not all in the same direction; and a similar thing is true of the gear 99 and the even numbered gears 96 all of which are geared to the dial N. There is nothing in the Wahl machine to prevent this simultaneous turning of several gears. The Wahl machine does have a locking tooth just at the right of master wheel 13, which tooth will prevent rotation of the M gears when the N gears are being operated, and vice versa. From what has just been said it is apparent that in order to provide detent mechanism for holding this entire train of gearing in place when it is away from the master wheel only two detents are necessary and in the present instance I have shown these consisting of arms 128, each having a tooth adapted to enter an interdental space of the pinion 113 or 114 as shown in Fig. 2.

These two arms 128 have hubs mounted on a rock shaft 130 pivoted in the upper parts of the frame plates 90, said hubs being secured to said shaft as by pins 131. Rigidly mounted on the same rock shaft 130 are two other arms 132 projecting downward and rearward and supporting a transverse universal bar 133. Said universal bar may conveniently consist of a rod or wire inserted in holes in the arms 132, endwise motion of said rod being prevented by the side plates 90. A tension spring 135 connected to one of the arms 132 and to a loop 136 surrounding the shaft 111, normally presses the detents against the pinions.

The universal bar 133 is engaged by a series of levers 137 which are all alike except the extreme right-hand one which I have lettered 137$^a$. Each of these levers is pivoted on a rod 138 in the lower rear part of the register, which rod is secured to the side plates 90 by screws. The rod 138 and another rod 140 above it may occupy the same positions in this register that the rods do in an ordinary Wahl totalizer on which the Geneva carrying levers are pivoted, and the lower parts of the levers 137, except lever 137$^a$, may be identical in size, shape and arrangement with the said levers of an ordinary totalizer. Each of them has at its lower end a notch 141 into which the master dog 14 of the machine extends when that particular denomination is in position to be operated. Each of the levers 137 and 137$^a$ is controlled by a spring 142 connected thereto and to a rod 143 the same as in a Wahl totalizer. Each of said levers has a finger 144, contact of which with the rod 140 limits the motion of the levers under their springs 142. Each of said levers has its upper end in front of the universal bar 133. When a key is depressed the master dog 14 moves toward the front of the machine and operates that lever 137 which is in engagement with it and said lever acting on the universal bar 133 releases the detents 128.

The operator can test the accuracy of his work by inspection at the proper time of the dials M, N or $m$, $n$, but I prefer to employ a more positive means of notifying the operator of any mistake, and to that end I provide means for locking up the machine after writing the second digit of the function or symbol in case the writing of the symbol does not bring both dials to their normal or zero position. This can of course be done in a variety of ways. In the present instance, each of said dials has projecting from its left-hand face a disk 145 against the periphery of which there is pressed a feeler 146. There are two of these feelers, one for each of the disks 145 and they are here shown as made of a single piece of sheet metal stamped out and bent up in such a way as to produce a yoke piece 147 connecting the two feelers. This yoke frame comprising the yoke bar 147 and the two feeler fingers 146 is pivoted on the shaft 130 as perhaps best shown in Fig. 7, the hub of one of the detents 128 being situated between the two branches of the yoke frame and holding the latter against endwise motion on the shaft. Each of said feeler fingers has a nose 148 the point of which is pressed against the disk 145 and each of said disks has two notches 150 diametrically opposite to each other and in such position that when one of the zeros of the dials M or N shows through the sight-opening the nose will be in one of said notches and the same will be true when one of the red spots on the dial $m$ or $n$ shows through the sight-opening. When both dials are in their initial or zero positions the feeler fingers can drop toward the front of the machine as shown in Fig. 2 but under any other condition they will be swung toward the rear of the machine as shown in Fig. 5.

Figures 4, 5, 6, 7:
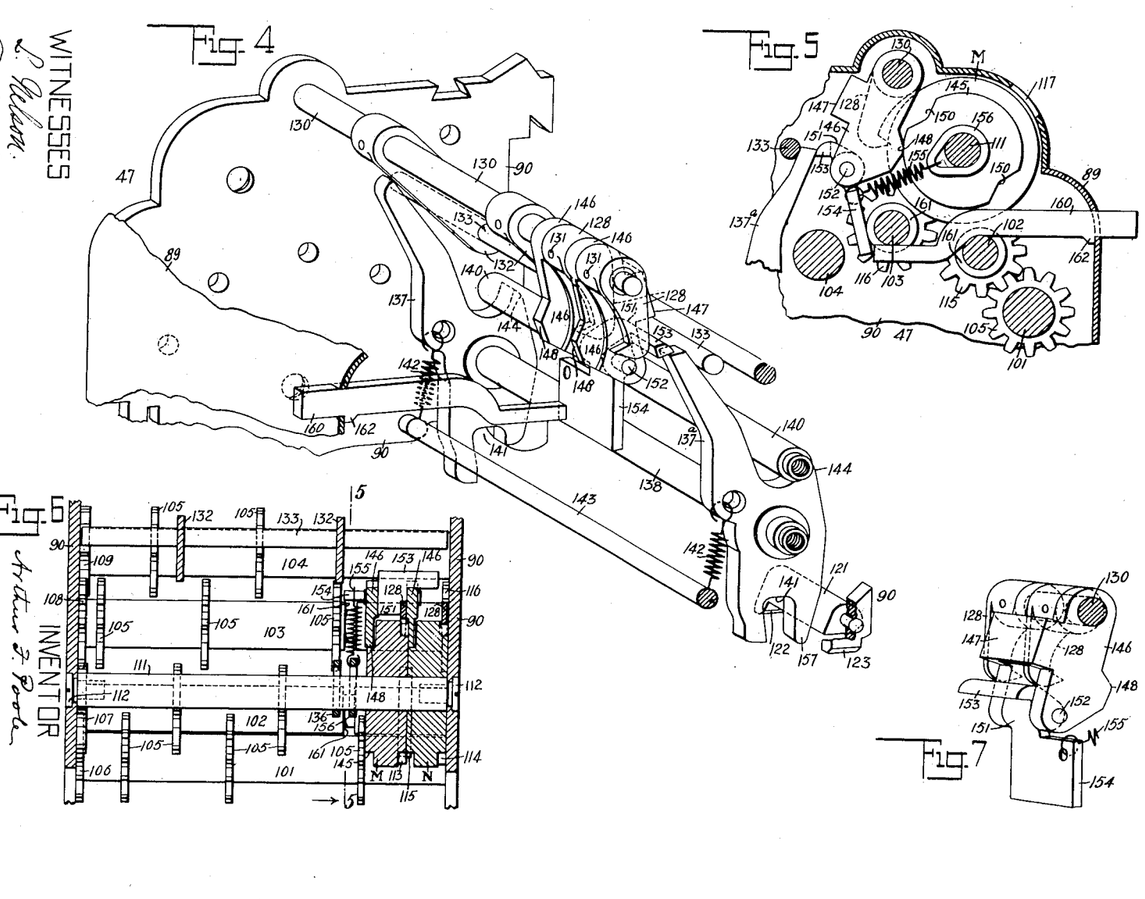
Figure 4 is an isometric view of some of the mechanism of said register.
Figure 5 is a fragmentary sectional view of said register taken on the line 5—5 of Figure 6 and looking toward the right.
Figure 6 is a partial plan view of said register in horizontal section on the line 6—6 of Figure 2.
Figure 7 is a perspective view of certain feeler and locking devices included in said register.

The locking means comprises means whereby the special lever 137$^a$ will when operated be prevented from returning to normal position in case the feeler frame is held back as shown in Fig. 5, that is to say, in case one or both of the dials are not in zero position. To this end a locking block 151 has trunnions 152 which are pivoted in the free ends of the feeler fingers 146. Said block has a locking nose 153 which projects far enough toward the right to bring it into the plane of the lever 137$^a$. Said block also has a depending arm 154 which is connected by a spring 155 with a loop 156 on the rod 111. The tension of said spring tends to swing the block 151 so as to pull its depending arm 154 forward against the shaft 103, which shaft acts as a stop for this part. Said shaft acting as a fulcrum the spring also tends to press the feeler fingers against the disk 145. When the parts are in normal or zero position the locking nose 153 stands above the upper end of lever 137$^a$, which upper end is made to come to a sharp angle in order to cooperate properly with the locking nose as distinguished from the other levers 137 whose upper ends are preferably rounded. When one of the dials is turned from its zero position the feeler fingers will be forced rearward, carrying the pivots or trunnions 152 with them, and the locking block 151 taking a fulcrum on the shaft 103 will have a tendency by this motion to be rocked so as to move its locking nose 153 over the upper end of lever 137$^a$. If when a key is struck to write the second digit of the symbol the parts are still in this position, lever 137$^a$ will be moved rearward from under nose 153, which will immediately snap down in front of said lever as shown in Fig. 5, thus preventing the lever from returning to normal position. This particular lever 137ª has the rear side of the notch 141 closed by an arm 157 longer than usual so that when the lever 137ª is prevented from returning to normal position it also prevents the return to normal position of the master dog 14. This locks up the machine in two ways. In the first place said master dog has a rearwardly extending arm which when the dog is operated enters a notch in the rack 24, Fig. 2, and locks the carriage against travel. In the second place when the dog 14 cannot return to normal position the universal bar of the Wahl actuator also cannot return to normal position and a certain full stroke pawl, fully described in the Wahl patent above referred to, will prevent the depressed key from returning to normal, and said depressed key will through a certain single key mechanism or key arrester mechanism prevent the depression of any other numeral key, all as will be understood from the ordinary construction of the Wahl machine and from the Wahl patent mentioned. Both the numeral keys and the carriage of the machine are therefore tied up and the operator is thereby automatically notified that he has made a mistake in the copying of the number, or of its symbol.

When by this locking up of the machine the operator has been notified that he has made a mistake the locking mechanism has performed its function and it should then be released in order that the operator may correct his mistake. To this end I have provided a small key or push bar 160 projecting through the casing plate 89 as shown in Figs. 2 and 4. This bar extends back into the register over the shaft 102 and under the shaft 103 and its rear end stands in such position that if the bar be pushed by hand toward the rear it will act on arm 154 of the locking block and rock said block about its pivot 152 against the tension of spring 155 so as to unlock lever 137ª and permit the latter to return to normal position. In order to provide room for this bar and to guide it, two annular grooves 161 are turned, one in shaft 102 and the other in shaft 103. The key or push bar 160 is seated in these grooves. The forward motion of said bar is limited by a lug 162 thereon engaging the casing plate 89.

The operation in the case of the particular example of the invention above described in detail, is as follows: When the operator has computed a new balance he will find the amount of said balance indicated on the cross totalizer 26. He will then bring the carriage to write in the third column on the work sheet 46 and will there copy said balance on to the paper and subtract it out of said cross totalizer. If this has been correctly done he will find the machine ready for the copying of the function from the dials M, N. If, however, he has made an error in the writing of the balance the machine will be locked up by the locking mechanism including the lever 53, arm 86, etc. He will then have to go back and correct the copying of the balance. The gearing in the computing register 47 is such that by the act of making the necessary correction in the copying he will also correct the computed symbol. Having copied said balance correctly he will press the space key of the typewriter to bring the gear wheel 98 into mesh with master wheel 13 and will then copy the function from the dials M and N into column 118. If he does not copy these correctly the machine will be locked up by the means above described. In this event he must press the bar 160 to unlock the machine; he will then go back to gear 98 and operate the correction lever of the Wahl machine which reverses the motion of the master wheel 13. He will then copy from the paper the function incorrectly written there, thus subtracting said incorrect function from the dials M, N and restoring said dials to the positions they occupied after the writing of the balance and therefore restoring to said dials an indication of the true function. He will then erase the incorrectly written function from the paper. When he has copied the function correctly he can proceed with his work on the next succeeding ledger sheet 46. When he puts one of these sheets into his machine the first operation is to copy in the column marked "Pick-up balance" the old balance last indicated on said sheet, and following that to copy from said sheet the symbol there printed. If this work is done correctly all will go well but if he has made a mistake the machine will be locked up by the failure of the dials $m$, $n$ to come to zero. This is because if he had copied the old balance correctly there would have been computed on said dials the same function that was computed on the dials M, N in that preceding operation when the old balance was written and when he copied the old function from the balance column 118 into the column 120 the dials $m$, $n$ would have been restored to zero had the work been correctly done. Finding the machine thus locked up he will compare the number he has written with the number that he attempted to copy and find out where his error was. If the error consisted in copying the function wrong then it can be corrected by setting the master wheel for subtraction and subtracting out the function originally written, erasing it from the paper and writing in the correct function. If the error was in the copying of the amount of the balance then he must go back and correct the writing in the manner customary on the Wahl machine; that is to say, he must set the machine for subtraction by operating the correction lever and rewrite the erroneously written digit or digits, thus subtracting his error out of the cross totalizer 26 and also out of the function computer 48. He must then erase these erroneous digits from the paper, restore the correction lever to normal and write the correct digits. In this instance as in the former instance the act of correcting the number will also correct the symbol. Not until it is all corrected will his machine be unlocked nor will he be able to proceed with his writing.

It will be perceived that my invention may be said to comprise two parts and that in the specific instance of said invention herein described in detail, one of these parts has to do with the register 47 and the other with the register 48. The register 47 is used in conjunction with printing mechanism to print a number, to compute the function or symbol appropriate to that number, and to print said function or symbol in conjunction with the number. This part of the invention is preliminary to the second part which has to do with the register 48, the purpose of which is to catch up any mistake that the operator may make in copying a number previously printed. It will readily be perceived that these two things might in some instances be done by two different machines and even by two different kinds of machines. On the other hand, they may in some instances be done at different times with the same identical mechanism.

It will also be perceived that whereas I have shown my invention in the present instance in conjunction with an adding and subtracting machine or accounting machine, still the adding and subtracting totalizers as 21, 22 and 26 are merely devices which in the present instance are used in conjunction with the present invention, which invention could be worked just the same if those totalizers were not present. I desire to claim the invention in combination with calculating mechanism but my broader claims are not limited to that combination. The invention has a large field of usefulness where the only object is to improve the accuracy with which numbers are copied from one piece of paper to another.

It may be added that obviously the symbol computer can be cleared at any time by moving the gear 98 into mesh with the master wheel and holding it there and striking the "1" key, for example, repeatedly until either the zero of dial M, or the red spot of dial *m* appears at the sight opening, and then repeating the same operation for the dial N or *n* with the gear 99 in mesh with the master wheel.

Referring to that part of the invention involving the register 48, it is not essential in all instances that the function computed by the mechanism be identical with the function entered into the machine, as by striking the numeral keys when the master wheel is in engagement with gears 98 and 99. A construction is conceivable in which the computed and the entered functions are not alike but where, on the contrary, one of them is a function of the other.

It has been remarked hereinbefore that the invention is capable of being adapted to check the correctness with which words or other combinations of letters are copied. That this is so is obvious from the consideration that there is nothing to prevent the keys 11 from being increased in number and connected to letter types instead of numeral types, and the whole system would work just the same in that event. In my claims, however, I have not taken the pains to distinguish between a series of characters representing a number and a series of characters representing a word but have referred to said characters as "digits" and to the series of characters as "numbers." Even if letters were printed they would in the machine have numerical values because they would enter into a computation of the function or symbol. Hence it will be understood that in the claims the word "numbers" is intended to be broad enough to include words, and the word "digits" to include the letters of such words.

In my prior Patents. Nos. 1,283,293 dated Oct. 29, 1918 and 1,334,316 dated Mch. 23, 1920 I have shown mechanisms adapted for the computation of functions of numbers or of the digits of said numbers. In each of these instances I have shown two disks, one adapted to compute a certain "9-function" and the other a certain "11-function" of a number. In Patent 1,283,293 the principal purpose of this mechanism was to check the accuracy with which a total was copied out of a Wahl totalizer on to the paper, although it is pointed out in the patent that the mechanism is adapted to detect an error in the computation itself due to the calculating mechanism being out of order. In short, the function computing mechanism of said patent was in the nature of a clear signal device. In Patent 1,334,316 the object went a little further, the mechanism described in this patent being for the purpose of checking the accuracy of a computation previously made and of the work of copying the items and totals involved in that computation. In this patent no adding and subtracting mechanism is shown, the whole machine being really for the purpose of computing the functions and of restoring the function computing mechanism to zero at the proper time. This machine was designed to be used in going over or repeating a series of computations previously made.

In a sense this mechanism was adapted to check under certain conditions an error in the copying of the amounts from the paper. This patent describes a system according to which customers' deposit slips and paid checks are first sent to the bookkeeper of the bank who makes a ledger record thereof. These deposit and paid check items are handled a second time by a customers' statement clerk, for the purpose of making a record to be delivered to the customer on the first of every month as a statement of his account with the bank. The machine described in this patent when used in the manner there described will when an error has been made by either operator give an indication that in writing a particular customer's statement a mistake has been made somewhere and this indication will be given by the checking machine becoming locked. This machine therefor is capable of giving an indication of the erroneous copying of a number in this sense: that it can be used where two operators have had to copy the same series of numbers and if they do not both copy some one of said numbers alike the machine will be locked up. The patent does not disclose any way to prevent one operator from copying a number wrong in the first instance. On the contrary the machine described in the Patent 1,334,316 is rather designed to compare the work of two operators, the machine detecting any inconsistency between the two.

The 9-function computed by the two prior machines above mentioned may be stated to be the remainder that will be left after dividing a number by 9. The 11-function of said machines is similar; that is to say, the 11-disk or wheel in said machines would after a computation involving the addition and subtraction of a series of numbers be found finally displaced from its normal position by a number of units equal to the remainder that would be left after dividing the algebraic sum of said numbers by 11. The 9-function is computed by the simple process of adding on one wheel all of the digits of all of the numbers involved in the computation. The 11-function is obtained by turning one wheel in one direction in accordance with the digits of odd-numbered denomination and in the opposite direction in accordance with the digits of even denomination. In the patented machines there are two disks, one for the 9-function and the other for the 11-function. These functions, namely, the 9-and 11-functions, can be used in connection with my present scheme of invention if preferred. They have the advantage that they are true functions of the numbers in this sense, namely, that in adding up a series of positive and negative numbers the two disks computing the 9 and 11-functions can be used throughout the computation and at the end of the computation said disks will be found occupying the same positions that they would have occupied had the total been written as a single number. For example, the 9-function of 14 is "5," and the 11-function of 14 is "3," regardless of whether the number 14 be written as one number or whether it be accumulated as the sum of several numbers. The symbols described hereinbefore in the present specification are not of this character. For example, if the number "14" were written on my present machine the "1" would be subtracted on the N disk and the "4" added on the M disk so that the reading would be "49" whereas if "8" were added to "6", 14 in all would be added on the M disk, which would therefore stand at "4" and the N disk would stand at zero. It may be seen therefore that the symbols computed by the present machine are more or less arbitrary functions of the series of digits, a plurality of which are combined according to a more or less arbitrary rule to produce one digit of a symbol and a plurality of the digits of the number are combined according to the same or some other equally arbitrary rule to produce the other digit of the symbol. This results in the symbol having, generally, a less number of digits than the number.

I have referred to the machines of my prior patents as being capable of computing certain functions, but that is so only in the sense that certain wheels or disks in said machines are set in accordance with such functions. Said disks, however, do not display any characters, nor is there any means for printing the computed functions nor even of apprising the operator as to what function was computed. In fact, an operator could use those machines successfully without even being aware that any functions were computed by them. Moreover, even if the operator were to discover in some way what function had been computed in one of those machines at a given time, the printing of that function would not restore the computing disks to zero. Moreover, the inventions of my prior patents did not detect an error in copying a single number in the first instance. In order for those inventions to apply, there must be a computation involving a plurality of numbers.

I have hereinbefore frequently referred to the "function or symbol" of a number or of the digits of said number. Neither of these words, according to the ordinary usage thereof, has quite the meaning sought to be conveyed in describing my invention. In the claims I shall use the word "symbol," for lack of a better, believing that its intended meaning in said claims will be understood from a reading of this specification.

It will of course be understood that the present invention could be carried out by simply computing the 11-function which would be done on a single 11-tooth dial by turning it in one direction for the odd-numbered digits and in the opposite direction for the even numbered digits, and in some instances this might be considered sufficient. The principal drawback of it is that there are only eleven different symbols so that the chance or probability of the machine detecting an error would be that in general it would detect said error ten times out of eleven. The two dials described herein give ninety-nine different symbols and the probability of detecting an error, said probability being estimated in the same way as above, will be raised from ten times out of eleven to ninety-nine times out of one hundred.

The actual probability of detecting an error by this machine is, however, higher than ninety-nine times out of one hundred. That ratio, ninety-nine to one hundred, is based on the assumption that the operator makes no effort at all to copy either the number or the symbol but writes both at random. If he did that a large number of times his machine would be locked up about ninety-nine times out of a hundred, the probability of his stumbling on to the right symbol for the particular number he had written being one in a hundred. Persons who are copying numbers, however, do not copy them at random and of the mistakes that they actually do make a vast majority fall into certain well defined categories. One of these is to make a mistake in copying a digit; for example, a "6" can easily be mistaken for a "9" and an indistinctly written "8" might easily be copied as a "3." The probability of my mechanism failing to detect an error of this sort is small. One of the commonest of errors in copying numbers is that of a transposition. For instance, 1857 will sometimes be copied 1875. This error would destroy both the M and the N functions in my mechanism, for on the M-wheel would be added a "5" instead of a "7" and on the N-wheel a "7" instead of a "5." An operator occasionally makes a double transposition, that is to say, he may copy the number 123 as 321. This error would also be detected by my machine. The "3" and the "1" would both be entered on the same dial but in the opposite directions so that their difference namely, "2", instead of being subtracted on the dial M, would be added on it. Sometimes in copying large numbers the operator begins at the wrong denomination. If the first digit is in tens of millions he may begin in millions or in hundreds of millions. This error would completely disarrange the computation of the function as every digit of the number would be entered into the wrong dial, and most of them in the wrong direction. It will thus be seen that the described scheme or rule according to which the digits are combined into symbols is adapted to detect the errors which operators do commonly make so that the probability of the machine detecting such errors is high.

In the specific embodiment of my invention hereindescribed some of the features have been determined by consideration of the fact that the invention is embodied in the Wahl computing mechanism. For example, my function computing registers are made in the form of Wahl totalizers so that they can be mounted on the regular Wahl truck and can take the place of totalizers or dummies heretofore used. The use of numerals on the dials M, N is more convenient in the Wahl machine than the use of other characters because the differential mechanism of that machine is controlled by the ten numeral keys of the typewriter; but as far as my invention is concerned letters or arbitrary characters might be used. A slight modification of the Remington accounting machine with the Wahl mechanism included in it, would enable me to use letters. For example, the numeral type bars of the machine might have letters for upper case characters and corresponding letters could be used on the dials. In writing the function the shift key 12 would first be operated so as to write the letters instead of numerals but the keys would still operate the function computing mechanism.

In some machines, for example listing machines of the Burroughs type, there might be separate rows of keys for the symbols and these could have letters or any other suitable characters on them. I have used numerals out of a desire to avoid making any change in the standard mechanism of the Remington accounting machine rather than because I prefer them.

Even as that machine is sometimes manufactured there are punctuation marks used as upper case characters on the numeral keys and it would be possible to mark the dials with corresponding characters and to use said characters for the symbols. The use of some other characters for this purpose than numerals would have the advantage that it would avoid any possibility of confusion between the number itself and its symbol. Moreover, I have made my dials work in cycles of ten rather than in some other number, because the ordinary Wahl actuator is arranged for ten numerals. Actuators are made, however, for use in handling English money which include an additional key adapted to turn the master wheel ten teeth, these being called sterling actuators. With such a machine the dials could work in cycles of eleven, some arbitrary character being employed for the eleventh space. The use of a dial that works in cycles of some odd number, such for example, as eleven, has one advantage over a cycle of ten. In the latter case plus 5 and minus 5 give the same indication, namely "5" on the dial, whereas if there were eleven steps in the cycle plus 5 would show "5" on the dial and minus 5 would show "6." This would be an advantage.

I may say therefore that one of the minor objects of my invention has been to provide a function computing device for the purpose of checking the correctness of the copying of numbers which device can be placed upon existing calculating machines without changing said machines.

I am aware that it is old to control the introduction of numbers into a calculating machine and also to control the operation of various machines by means of perforated cards or strips and that in these machines the entry of the number or other matter is rendered mechanically correct but this is not the subject-matter of my invention, which invention has to do with checking the accuracy of the human element, which usually means the accuracy with which an operator strikes the keys of a calculating or typewriting or similar machine.

What I claim as new and desire to secure by Letters Patent, is:—

1. The combination of means for computing a short symbol of a series of digits, and means for printing said series of digits and said symbol.

2. The combination of computing mechanism arranged to combine a plurality of the digits of a series of digits according to a rule into a symbol, and means for printing said digits and said symbol.

3. The combination of a series of keys, key controlled means for entering into the machine the series of digits of a number, means for computing a short symbol of said digits, and means for printing said number and symbol and for eliminating said symbol from said symbol computing means.

4. Printing means, symbol computing means and connections so combined that a short symbol is computed in conjunction with the printing of a number and that said computing mechanism is cleared in conjunction with the printing of the symbol.

5. The combination of calculating mechanism including means for registering a total; means for computing a short symbol of said total; and means for printing said total and its said symbol.

6. A machine having in combination, calculating mechanism including means for registering a total and for clearing said registering means, means for computing a short symbol of said total, and printing means; the combination including means whereby said symbol is computed in conjunction with the clearing of said registering means and the printing of the total, and said symbol computing means is cleared in conjunction with the printing of said symbol.

7. A machine having in combination, a series of denominational members each settable in accordance with a digit of a number, symbol members less in number than said denominational members, and means connecting said denominational members with said symbol members whereby a symbol of said number is computed on said symbol members under the control of said denominational members.

8. The combination of a series of denominational members, means for operating the several said members in accordance with the digits of a number, symbol computing wheels less in number than said denominational members, and gearing connecting said wheels with said denominational members in accordance with a definite rule, each symbol wheel being geared to a plurality of said denominational members.

9. The combination of a series of denominational members, means for operating the several said members in accordance with the digits of a number, symbol computing wheels less in number than said denominational members, gearing connecting said wheels with said denominational members in accordance with a definite rule, each symbol wheel being geared to a plurality of said denominational members, separate means for actuating said symbol wheels to set the latter to zero, and means for printing said number and said symbol.

10. The combination of keys, differential mechanism controlled by said keys and including a master wheel, a series of denominational members 96 adapted to be operated seriatim by said master wheel, and means operated by said denominational members for computing a symbol appropriate to said number, said symbol having a number of digits less than the number of said denominational members.

11. The combination of keys, printing means controlled thereby, differential mechanism controlled by said keys and including a master wheel, a series of denominational members 96 adapted to be operated seriatim by said master wheel, means operated by said differential members for computing a symbol appropriate to said number, said symbol having a number of digits less than the number of said denominational members, and one or more additional members as 98, operated by said master wheel in the act of printing said symbol and so connected with said symbol computing means as to restore the latter to zero, 12. Means for computing according to rule a short symbol of a series of digits and for exhibiting said symbol so that it can be read and copied.

13. The combination with a number computing mechanism, of means for producing a visible short symbol of the number computed.

14. The combination with a series of adjustable digit carriers, of means for producing a visible short symbol for each row of adjusted or assembled digits.

15. Mechanism capable of producing a row of digits, combined with means for producing a copyable short symbol of said digits, and means for operating said symbol-producing means in conjunction with said mechanism at one operation to produce said symbol in the act of producing said row of digits, and at another operation to produce said symbol in the act of erasing said row of digits.

16. The combination of a totalizer for accumulating a total as the result of a computation, and means for computing and exhibiting a short symbol of said total by the act of clearing the totalizer.

17. A machine having in combination, means for computing a short symbol of a number being entered by manipulation into the machine, and means for determining whether said computed symbol corresponds with a previously computed symbol.

18. A machine having in combination, means for computing a short symbol of a number being entered by manipulation into the machine; and means for entering into the machine by manipulation a previously computed symbol and for determining whether said previously computed symbol corresponds with the symbol computed at the time.

19. A machine having in combination, means for computing a short symbol of a number being entered by manipulation into the machine; means for entering into the machine by manipulation a previousely computed symbol; and a lock brought into action in case the previously computed symbol does not correspond with the symbol computed at the time.

20. A machine having in combination, keys; means for entering a number into the machine by manipulation of said keys and for computing a short symbol of said number; and means for entering into the machine by manipulation of said keys a previously computed symbol and for comparing said previously computed symbol with the symbol computed at the time.

21. A machine having in combination, keys; means for computing a short symbol of a number being entered into the machine by manipulation of said keys and for also entering a previously computed function or symbol into the machine by manipulation of said keys; and means for notifying the operator in case the directly entered symbol does not agree with the symbol computed at the time.

22. A machine having in combination, keys; mechanism for computing a short symbol of a number being entered into the machine by said keys; key-controlled means for printing said number and a previously computed short symbol; and means for notifying the operator in case the symbol computed by said mechanism does not agree with the previously obtained symbol printed by said key controlled means.

23. A machine comprising in combination, means for entering a number into the machine and simultaneously computing a short symbol of said number, means whereby the operator can enter into the machine a previously computed symbol, and means for comparing the symbol just computed by the machine with the said previously computed symbol entered by the operator.

24. The combination with one or more devices displaceable according to a rule to produce a short symbol of a plurality of digits, means for entering said digits into the machine under the control of the operator and automatically displacing said device or devices as aforesaid and for entering into the machine under the control of the operator a previously computed symbol; the construction and arrangement being such that in case the correct series of digits and the correct symbol are entered by the operator said displaceable device or devices will come to zero.

25. The combination of one or more devices displaceable according to a rule to produce a short symbol of a plurality of digits; means for entering said digits into the machine under the control of the operator and automatically displacing said device or devices as aforesaid and for entering into the machine under the control of the operator a previously computed symbol; and a lock brought into action in case said previously computed symbol does not correspond with the symbol computed by the mechanism at the time.

26. A method of determining whether a given number has been correctly copied which consists in computing by rule a symbol for said number when it is first written and in making a record of said symbol, and subsequently, in undertaking to write said number again, making a second symbol computation by the same rule during the undertaken writing of the number; whereby if the second symbol should not agree or harmonize with the first symbol it will be determined that an error has been made in the copying of the number first written.

27. A method of determining whether a given number has been correctly copied which consists in mechanically computing by rule a symbol for said number when it is first written and in making a record of said symbol, and subsequently, in undertaking to write said number again, making a second symbol computation mechanically by the same rule during the undertaken writing of the number; whereby if the second symbol should not agree or harmonize with the first symbol it will be determined that an error has been made in the copying of the number first written.

28. A method of determining whether a number has been correctly copied, which consists in printing the original number in a typewriting machine which is provided with a symbol computing mechanism and computing said symbol of the number at the time of its printing and in printing said symbol in proximity to said number; then undertaking to copy said number by writing it and at the same time making a second symbol computation in a typewriting machine provided with symbol computing mechanism, and ascertaining whether the two computed symbols agree or are in harmony.

29. A step in a method of determining whether a number has been correctly copied, which consists in printing the original number in a typewriting machine which is provided with a symbol computing mechanism and computing said symbol of the number at the time of its printing and in printing said symbol in proximity to said number.

30. A step in a method of determining whether a number has been correctly copied, which consists in undertaking to write in a typewriting machine provided with a symbol computing mechanism a previously written number having a mechanically computed symbol and at the same time operating said symbol computing mechanism and finally comparing the first computed symbol with the second computed symbol.

31. The combination with a paper having printed thereon a number, or a plurality of numbers, and a short symbol appropriate to said number, or to each of said numbers; and a machine whereby an operator may by manipulation copy from said paper a number and its appropriate symbol, said machine having mechanism included therein for computing a short symbol of the copied number and comparing said computed symbol with the symbol copied from said paper.

32. The combination with numeral keys, a master wheel and a traveling carriage, of a series of denominational members actuated by said master wheel seriatim, and means operated by said denominational members for computing, according to a definite rule, a short symbol of the digits according to which said denominational members are operated by said master wheel.

33. The combination with actuating mechanism and a totalizer on which calculations involving numbers can be registered, of a symbol computing register having a series of wheels corresponding in denominational value with the respective wheels of said totalizer, and means operated by said denominational members for computing a short symbol of a number entered by said actuating mechanism into said totalizer.

34. The combination with actuating mechanism and a totalizer on which calculations involving numbers can be registered, of a symbol computing register having a series of wheels corresponding in denominational value with the respective wheels of said totalizer, means operated by said denominational members for computing a short symbol of a number entered by said actuating mechanism into said totalizer, and additional wheels in said symbol computing register adapted to be operated by actuating mechanism without operating said totalizer.

35. The combination with a master wheel and a traveling carriage, of a symbol computing register adapted to compute a short symbol of the digits of a number in accordance with which said master wheel is operated seriatim, said register being detachably and adjustably mounted in relation to said master wheel.

36. The combination with actuating mechanism and a totalizer adapted to be operated by said actuator to make calculations involving numbers in a plurality of denominations, of a symbol computing register having a series of denominational members corresponding respectively with the denominational members of said totalizer, symbol computing wheels connected with said denominational members but less in number than said denominational members, and other members in addition to said denominational members adapted to actuate said symbol computing wheels independently.

37. The combination with a main totalizer supporting bar, a main master wheel, and a cross footing totalizer and master wheel, of a symbol computing register adjustably mounted on said main totalizer support.

38. The combination with a main totalizer support, a main master wheel, a cross totalizer, a cross master wheel, and a releasable connecting device causing a relative reciprocation between said cross totalizer and its master wheel, of a symbol computing register mounted on said main totalizer support and having denominational members adapted to be actuated by said main master wheel in denominational positions corresponding to those of the wheels of the cross totalizer and having additional members adapted also to be actuated by said main master wheel, and two abutments as 121 and 123 to actuate said reciprocating means once during the traverse of said master wheel through said denominational members and again during the traverse of said master wheel through said additional members.

39. The combination with a traveling carriage, a main master wheel, a cross footing master wheel, and a cross footing totalizer, of a symbol computing register adapted to be operated in denominational positions corresponding with those of said cross footing totalizer and adapted to be operated also in other positions, and means for causing said cross totalizer to be operated in said denominational positions and to be disconnected in said other positions.

40. A symbol computing register comprising a series of wheels 96, a dial, and gearing whereby some of said wheels 96 turn said dial in one direction and other of said wheels 96 turn said dial in the opposite direction.

41. A symbol computing register comprising a series of wheels 96, a plurality of dials, a plurality of gear trains, one for each of said dials, each of said gear trains being geared with a plurality of said wheels 96.

42. A symbol computing register comprising a series of gears 96, two parallel shafts 101 and 102 geared together, a dial operated by one of said shafts, and pinions on said shafts, the pinions on one of said shafts meshing with certain of said wheels 96 and the pinions on the other of said shafts meshing with other of said gears 96 whereby some of said gears 96 turn said dial in one direction and said other gears 96 turn said dial in the opposite direction.

43. The combination with an actuating mechanism, of a symbol computing register having a series of wheels one for each denomination of a number; means in said register for computing a short symbol of said number; other wheels operated by said actuating mechanism and connected with said symbol computing mechanism; and a lock arranged to become effective in case the actuation of said other wheels fails to bring said symbol computing mechanism to zero.

44. The combination with printing means, a traveling carriage, a main totalizer support, a main master wheel, a cross footing totalizer and a cross footing master wheel, of two symbol computing registers mounted on said main truck and each having denominational members corresponding with those of the cross totalizer and adapted to be actuated by said main master wheel, one of said symbol computing registers being adapted to compute a symbol of a number copied out of said cross totalizer in one column and the other of said registers being adapted to compute a symbol of a number entered into said cross totalizer in another column.

45. In a symbol computing register, the combination of symbol computing dials, means for actuating said dials, feelers 146 co-operating with said dials, a locking piece 151 pivoted in the free ends of said feelers and adapted to be swung to locking position when said feelers are displaced, and a lever 137$^a$ adapted to be locked by said locking piece.

46. The combination with keys and actuating mechanism including a master wheel and a master dog, of a symbol computing register comprising dials, feelers 146 co-operating with said dials, a locking piece 151 pivoted in the free ends of said feelers, and a lever 137$^a$ operated by said master dog and adapted to be locked when operated by said piece 151 in case said feelers are displaced.

47. The combination with keys and actuating mechanism including a master wheel and a master dog, of a symbol computing register comprising dials, feelers 146 co-operating with said dials, a locking piece 151 pivoted in the free ends of said feelers, a lever 137$^a$ operated by said master dog and adapted to be locked when operated by said piece 151 in case said feelers are displaced, and a hand-operated releasing device 160 adapted to release the lever 137$^a$ from said piece 151.

48. The combination with an actuator including a master wheel and a master dog, of a symbol computing register comprising a series of wheels adapted to be actuated seriatim by said master wheel and a series of levers adapted to be actuated seriatim by said master dog, symbol computing wheels geared to said denominational wheels and less in number than said denominational wheels, detents for said symbol computing wheels, and a universal bar operated by said levers and controlling said detents.

49. The combination with actuating mechanism, including two master wheels and a totalizer actuated by one of said master wheels, of a symbol computing register actuated by the other master wheel in denominational positions corresponding to those of said totalizer, clearance proof mechanism for said totalizer, means actuated by said actuating mechanism for clearing said symbol computing register after a total has been taken out of said totalizer and tested by said clearance proof mechanism, and clearance proof mechanism for said symbol computing register.

50. The combination with a traveling main truck, a main master wheel, a cross totalizer truck, and a cross master wheel, of a register adapted for computing a short symbol of a number, said register adjustably mounted on said main truck; and means whereby said register as it travels through a computing zone picks up and releases at suitable times said cross footing truck.

51. The combination with a traveling main truck, a main master wheel, a cross footing truck, and cross footing master wheel, of a register adapted to compute a short symbol of a number, said register adjustably mounted on said main truck, a cam on said register, and means whereby said cam automatically determines the direction of rotation of said cross master wheel.

52. The combination with a main columnar totalizer support and a main master wheel one traveling relative to the other, and a cross totalizer, of a register mounted on said main columnar totalizer support and adapted to compute a short function of a number registered in said cross totalizer and adapted also to be operated by said main master wheel to be cleared thereby, and a cam having two levels, one level adapted to set the cross footing mechanism for addition or subtraction as the case may be, and the other level adapted to disconnect said cross footing mechanism.

53. A method of writing a ledger sheet which consists in writing a current balance and computing by rule a short symbol of said balance and making a record of said symbol; and subsequently in undertaking to copy said balance, making a second symbol computation by the same rule during the copying of said balance whereby if the second symbol should not agree or harmonize with the first symbol it would be determined that an error had been made in the copying of the balance; and then writing new items and computing from said copied balance and new items a new balance to be recorded together with its appropriate symbol as before.

54. A symbol computing register comprising a symbol wheel, a series of denominational devices adapted to be actuated according to the digits of a number, and means whereby some of said devices turn said symbol wheel in one direction and other of said devices turn said symbol wheel in the opposite direction.

Signed at the borough of Manhattan, city of New York, in the county of New York and State of New York, this 16th day of November A. D. 1921.

ARTHUR F. POOLE.

Witnesses:
CHARLES E. SMITH,
LILLIAN NELSON.